United States Patent
Jang et al.

(10) Patent No.: US 10,887,372 B2
(45) Date of Patent: Jan. 5, 2021

(54) METHOD AND APPARATUS FOR CONTROLLING UPLOAD SIZE OF DEVICE

(71) Applicant: Samsung Electronics Co., Ltd., Suwon-si (KR)

(72) Inventors: Soo-Young Jang, Suwon-si (KR); Sin-Seok Seo, Seongnam-si (KR); Sang-Jun Moon, Yongin-si (KR); Yong-Seok Park, Seoul (KR); Young-Suk Sun, Suwon-si (KR); Bong-Jhin Shin, Suwon-si (KR); Sang-Gon Lee, Suwon-si (KR); Hyeon-Hun Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 22 days.

(21) Appl. No.: 15/371,790

(22) Filed: Dec. 7, 2016

(65) Prior Publication Data
US 2017/0163716 A1    Jun. 8, 2017

(30) Foreign Application Priority Data

Dec. 8, 2015 (KR) .................. 10-2015-0174120

(51) Int. Cl.
*G06F 15/16* (2006.01)
*H04L 29/08* (2006.01)
(Continued)

(52) U.S. Cl.
CPC .......... *H04L 67/06* (2013.01); *H04L 41/0681* (2013.01); *H04L 41/0893* (2013.01);
(Continued)

(58) Field of Classification Search
CPC ..... H04L 67/1095; H04L 67/18; H04L 67/42; H04L 67/1021
See application file for complete search history.

(56) References Cited

U.S. PATENT DOCUMENTS 7,913,115 B1 * 3/2011 Powers ............... G06F 11/0748
                                                               714/18
8,909,261 B1   12/2014 Upadhyay et al.
(Continued)

FOREIGN PATENT DOCUMENTS

KR   10-2009-0049894 A   5/2009
KR   10-2010-0072992 A   7/2010
(Continued)

OTHER PUBLICATIONS

Sanjay Ghemawat, Howard Gobioff, and Shun-Tak Leung The Google File System; Google.
(Continued)

*Primary Examiner* — Suraj M Joshi
*Assistant Examiner* — Ayele F Woldemariam
(74) *Attorney, Agent, or Firm* — Jefferson IP Law, LLP

(57) ABSTRACT

A method for controlling an upload size of data by a device is provided. The method includes determining whether to change a size of data to be uploaded based on a policy of an upload target server, upon determining to change the size of the data to be uploaded, determining an initial transfer size of the data, and uploading a part of the data corresponding to the determined initial transfer size, updating an upload result of the partial data in an upload history, and determining a next transfer size for the data depending on a reception result of the part of the data from the upload target server for a period obtained from the policy.

14 Claims, 12 Drawing Sheets

(51) Int. Cl.
*H04L 12/24* (2006.01)
*H04L 29/14* (2006.01)

(52) U.S. Cl.
CPC .......... *H04L 67/10* (2013.01); *H04L 67/1097* (2013.01); *H04L 67/14* (2013.01); *H04L 69/40* (2013.01)

(56) References Cited

U.S. PATENT DOCUMENTS

| | | | |
|---|---|---|---|
| 9,706,429 B2* | 7/2017 | Ma | H04W 28/18 |
| 2003/0223390 A1 | 12/2003 | Huang et al. | |
| 2004/0180696 A1 | 9/2004 | Foore et al. | |
| 2005/0209927 A1 | 9/2005 | Aaltonene et al. | |
| 2007/0035764 A1* | 2/2007 | Aldrich | G06F 17/3028 |
| | | | 707/E17.031 |
| 2007/0038681 A1* | 2/2007 | Pierce | G06F 11/1464 |
| | | | 707/999.201 |
| 2008/0037055 A1* | 2/2008 | Yun | H04N 1/00214 |
| | | | 370/232 |
| 2008/0126517 A1* | 5/2008 | Nakatsuka | H04L 67/16 |
| | | | 709/219 |
| 2012/0060035 A1* | 3/2012 | Kalmady | H04L 9/32 |
| | | | 703/176 |
| 2012/0102154 A1 | 4/2012 | Huang et al. | |
| 2013/0046879 A1* | 2/2013 | Garcia | H04L 41/12 |
| | | | 709/224 |
| 2013/0173716 A1 | 7/2013 | Rogers | |
| 2013/0227124 A1* | 8/2013 | Yoon | H04L 67/42 |
| | | | 709/224 |
| 2015/0156281 A1* | 6/2015 | Krieger | H04L 67/42 |
| | | | 709/203 |
| 2015/0341822 A1 | 11/2015 | Ma | |

FOREIGN PATENT DOCUMENTS

| | | |
|---|---|---|
| KR | 10-2014-0110980 A | 9/2014 |
| WO | 2006/025789 A1 | 3/2006 |
| WO | 2012/005609 A1 | 1/2012 |
| WO | 2014/146100 A1 | 9/2014 |

OTHER PUBLICATIONS

Extended European Search Report dated Nov. 16, 2018, issued in a counterpart European application No. 16873350.9-1213/3384703.
Korean Office Action dated Oct. 20, 2020, issued in October Application No. 10-2015-0174120.

* cited by examiner

METHOD AND APPARATUS FOR CONTROLLING UPLOAD SIZE OF DEVICE

CROSS-REFERENCE TO RELATED APPLICATION(S)

This application claims the benefit under 35 U.S.C. § 119(a) of a Korean patent application filed on Dec. 8, 2015 in the Korean Intellectual Property Office and assigned Serial No. 10-2015-0174120, the entire disclosure of which is hereby incorporated by reference.

TECHNICAL FIELD

The present disclosure relates to a method and apparatus for adaptively controlling a size of the chunk that is the upload unit of a device.

BACKGROUND

The Internet has evolved from a human-centered connection network in which humans may create and consume information, into the Internet of things (IoT) network in which distributed components such as things may exchange and process information. As for Internet of everything (IoE) technology, Big Data processing technology through a connection to a cloud server and the like is one example that is combined with the IoT technology.

In order to implement IoT, technical elements such as sensing technology, wired/wireless communication and network infrastructure, service interface technology and security technology may be required. So, in recent years, technologies for connection between things, such as sensor network, machine-to-machine (M2M) and machine type communication (MTC), etc., have been studied.

In the IoT environment, an intelligent Internet technology (IT) service may be provided, in which the connected things may collect and analyze the data generated therein to create new value on human life. IoT may be applied to the fields of smart home, smart building, smart city, smart car or connected car, smart grid, health care, smart appliances and high-tech medical services, through the convergence between the existing IT technology and various industries.

As IoT is implemented, the amount of data that the user should store or archive for each purpose has surged. Due to this, it is typical to store the data in the cloud storage that is managed and owned by the hosting company, instead of storing the data in a hardware memory with a limited size or limited capacity.

The data to be uploaded to the cloud storage may be usually divided into units of chunks, and uploaded. While a device divides its desired data into units of chunks and uploads the divided data in units of chunks, transmission errors such as network disconnection may occur.

FIGS. 1A and 1B are diagrams illustrating examples of network disconnections according to the related art.

Referring to FIG. 1A, it is assumed that while a device 120a of a user was uploading data to a cloud storage in units of chunks within a service area 112 of an access point (AP) 110 in, for example, a café where the AP 110 provided with Wi-Fi is installed, the user's movement 130 has occurred. In this case, as the device 120b leaves the service area 112, the device 120b may be connected to a base station (or evolved node B (eNB)) 100 that provides long term evolution (LTE)-based wireless communication. At this time, network disconnection may occur in a handover process in which for the device 120b, its connection with Wi-Fi is disconnected and the device 120b is connected to LTE.

Referring to FIG. 1B, if a device 150b connected to the base station 100 providing LTE is located, as the user's movement 160 occurs, in a service area 142 in a home where an AP 140 providing Wi-Fi is installed, network disconnection may occur in a handover process in which for the device 150a, its connection with LTE is disconnected and the device 150a is connected to the AP 140, depending on the user's selection.

In a case where a device performs chunk-based upload, since the chunks that the device has transmitted before a transmission error of the upload occurs, are stored in the cloud storage, it is possible to upload the data beginning at the chunk of the data, in which an error has occurred, without the need to retransmit the data being transmitted, from the beginning Therefore, the chunk-based upload may be effective for mass-file uploads.

As the size of the chunks is larger, the transfer time of the chunks is longer, increasing the probability that a transmission error of the chunks will occur. In this case, if an error occurs during transmission of chunks, the chunks should be retransmitted, causing a decrease in the upload speed and an increase in the amount of data that should be retransmitted.

On the other hand, in a case where the size of the chunks is small, since it is necessary to receive a response (or acknowledgement) for a received chunk from the server providing the cloud storage in order to transmit the next chunk, the time for which the device waits for the response may occur. Therefore, an increased waiting time may occur, causing a decrease in the upload speed.

Further, every server providing the cloud storage may provide its own unique upload-related policy. For example, Table 1 below shows an example of the upload-related policies for the cloud storages.

TABLE 1

|  | OneDrive | Dropbox | Google Drive |
| --- | --- | --- | --- |
| Term | Resumable Item Upload | chunked upload | Resumable Upload |
| Single-file size (maximum upload size) | 100 MB | 150 MB | 5,120 GB |
| Maximum chunk size | 60 MB | 150 MB | 5,120 GB |
| Chunk size's unit | 320 KB (recommended) | 4 MB | 256 KB |
| Recommended chunk size | 5~10 MB | 4 MB | Large if possible |
| Retransmission point upon error occurrence | Starting point of chunk where error has occurred | Starting point of chunk where error has occurred | Error occurrence point |
| Upload URI expiry | Transmission of response marking upload expiry | 48 hours in maximum | About one week |

As shown in Table 1, the existing upload-related policies for the cloud storages use chunks, the size of which is fixed and relatively small, in order to minimize the amount of data that should be retransmitted during network disconnection.

As mentioned above, since there are advantages and disadvantages depending on the chunk size, there is a need for a way to control a variable chunk size that can improve the transfer rate during upload to the cloud storage.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus for adaptively controlling a chunk size during upload to the cloud storage, using a user's device.

In accordance with an aspect of the present disclosure, a method for controlling a data size to be uploaded to a server by a device, the method comprising determining whether to change the data size based on a policy of the server, if it is determined to change the data size, determining an initial transfer size of data to be uploaded, and uploading a part of the data corresponding to the determined initial transfer size to the server, updating an upload result of the partial data in an upload history stored in a memory, and determining a next transfer size for the data based on a reception result of the part of the data from the server during a period obtained from the policy.

In accordance with another aspect of the present disclosure, a device for controlling a data size to be uploaded to a server, the device comprising a controller configured to determine whether to change the data size based on a policy of the server, if it is determined to change the transfer size, determine to change the data size, determine an initial transfer size of data to be uploaded and upload a part of the data corresponding to the determined initial transfer size to the server, update an upload result of the partial data in an upload history stored in a memory, and determine a next transfer size for the data depending on a reception result of a part of the data from the server during a period obtained from the policy, and a transceiver configured to upload the part of the data corresponding to the determined initial transfer size.

Other aspects, advantages, and salient features of the disclosure will become apparent to those skilled in the art from the following detailed description, which, taken in conjunction with the annexed drawings, discloses various embodiments of the present disclosure.

Before undertaking the DETAILED DESCRIPTION below, it may be advantageous to set forth definitions of certain words and phrases used throughout this patent document. The terms "include" and "comprise," as well as derivatives thereof, mean inclusion without limitation, the term "or," is inclusive, meaning and/or, the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like, and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1A:
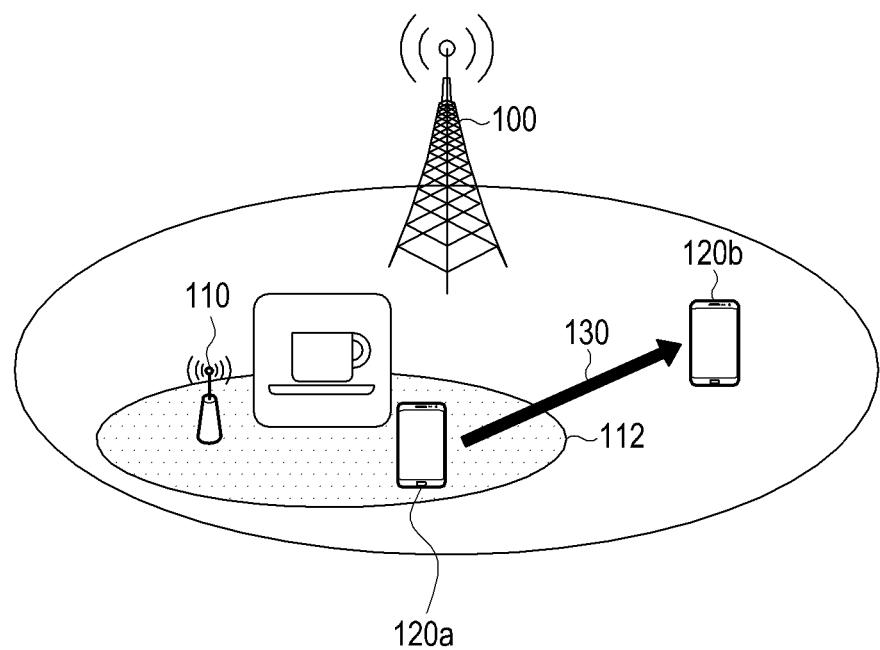
FIGS. 1A and 1B are diagrams illustrating examples of network disconnections according to the related art.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

Various changes may be made to the present disclosure, and the present disclosure may come with a diversity of embodiments. Some embodiments of the present disclosure are shown and described in connection with the drawings.

However, it should be appreciated that the present disclosure is not limited to the various embodiments, and all changes and/or equivalents or replacements thereto also belong to the scope of the present disclosure.

It is to be understood that the singular forms "a," "an," and "the" include plural referents unless the context clearly dictates otherwise. Thus, for example, reference to "a component surface" includes reference to one or more of such surfaces.

Ordinal numbers as herein used, such as "first", "second", etc., may modify various components of various embodiments, but do not limit those components. These terms are only used to distinguish one component from another. For example, according to various embodiments of the present disclosure, a first component may be denoted as a second component, and vice versa without departing from the scope of the present disclosure. The term "and/or" includes a combination of a plurality of listed relevant items, or any one of the plurality of listed relevant items.

The terms "comprise" and/or "comprising" as herein used specify the presence of disclosed functions, operations, or components, but do not preclude the presence or addition of one or more other functions, operations, or components. It will be further understood that the terms "comprise" and/or "have," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which the embodiments of the present disclosure belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

According to various embodiments of the present disclosure, an electronic device may include a communication function. For example, the electronic device may be at least one of a smart phone, a tablet personal computer (PC), a mobile phone, a video phone, an e-book reader, a desktop PC, a laptop PC, a netbook PC, a personal digital assistant (PDA), a portable multimedia player (PMP), an MP3 player, a mobile medical device, a camera, or a wearable device (e.g., head-mounted device (HMD), electronic clothing, electronic anklet, electronic necklace, electronic accessories (appcessory), electronic tattoo, smart watch or the like).

According to various embodiments of the present disclosure, the electronic device may be a smart home appliance with a communication function. For example, the smart home appliance may be at least one of a television (TV), a digital versatile disc (DVD) player, an audio player, a refrigerator, an air conditioner, a vacuum cleaner, an oven, a microwave oven, a washer, a dryer, an air purifier, a set-top box, a TV box (e.g., a Samsung HomeSync™, an Apple TV™, or a Google TV™), a gaming console, an electronic dictionary, a camcorder or a digital photo frame.

According to various embodiments of the present disclosure, the electronic device may be at least one of a medical device (e.g., a magnetic resonance angiography (MRA) device, a magnetic resonance imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (e.g., a nautical navigation device, a gyroscope, or a compass), avionics, a security device, an industrial or household robot, and the like.

According to various embodiments of the present disclosure, the electronic device may be at least one of a part of the furniture or building/structure, an electronic board, an electronic signature receiving device, a projector, or various meters (e.g., meters for water, electricity, gas or radio waves), each of which includes the communication function.

According to various embodiments of the present disclosure, the electronic device may be a combination of the above-described devices. Further, it will be apparent to those skilled in the art that an electronic device according to preferred embodiments of the present disclosure is not limited to the above-described devices.

Hereinafter, according to various embodiments of the present disclosure, a device performing upload to the cloud storage may be, for example, an electronic device.

Figure 2:
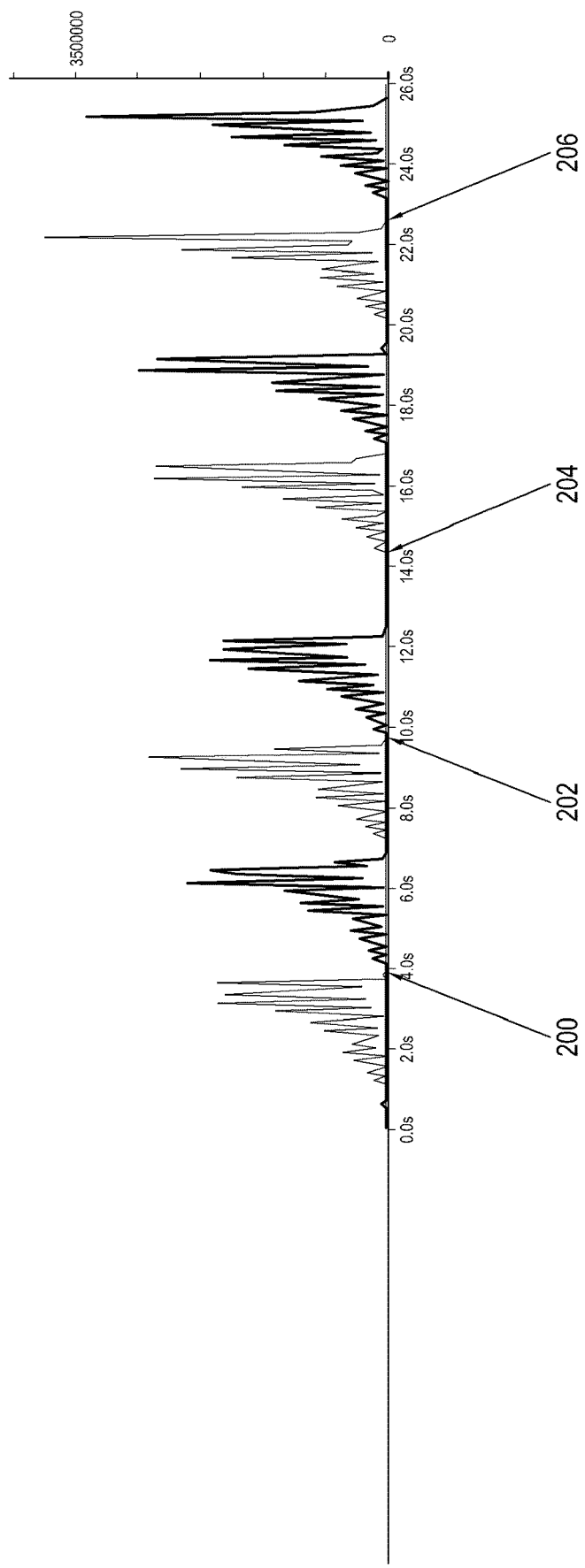
FIG. 2 is a graph illustrating an example of an upload transfer rate over time in case of uploading to a cloud storage according to an embodiment of the present disclosure.

FIG. 2 is a graph illustrating an example of an upload transfer rate over time in case of uploading to a cloud storage according to an embodiment of the present disclosure. In the following description, it is assumed that a device accesses long term evolution (LTE) and uploads one 100 MB file using a OneDrive application, which is one of the applications providing cloud storage.

Referring to FIG. 2, the y-axis represents the instantaneous speed, and the x-axis represents the upload speed. Each time the device has completed the transmission of one chunk, slow start for receiving a response indicating the successful reception of the transmitted chunk from the server begins (200, 202, 204 and 206). FIG. 2 shows a pattern that the upload speed dives at the time corresponding to each slow start, and increases if a response is received from the server. In other words, it can be seen that an idle time exists between chunk transmissions.

Figure 3A:
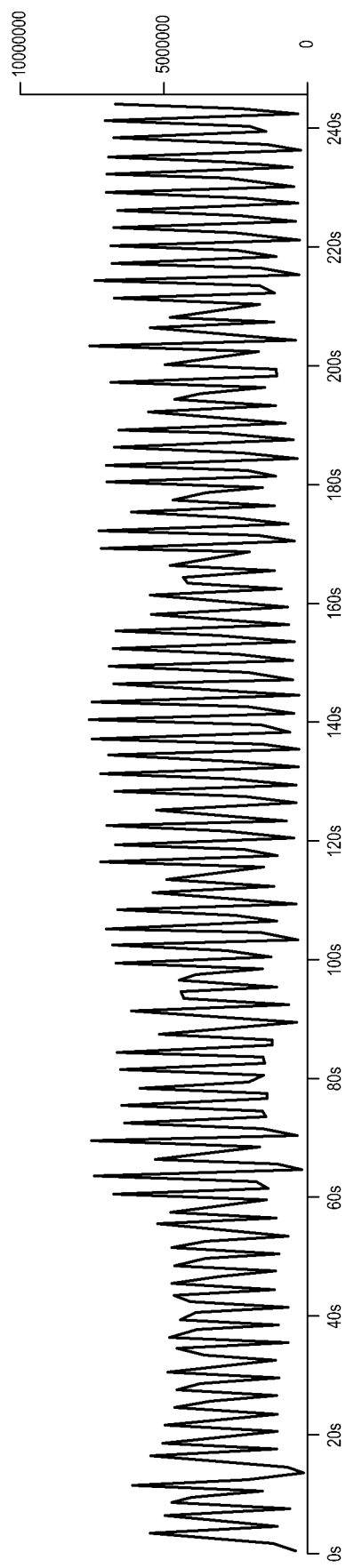
FIGS. 3A and 3B are graphs illustrating examples of an upload transfer rate over time in a case where a chunk size is changed in the experimental environment of FIG. 2 according to various embodiments of the present disclosure.
Figure 3B:
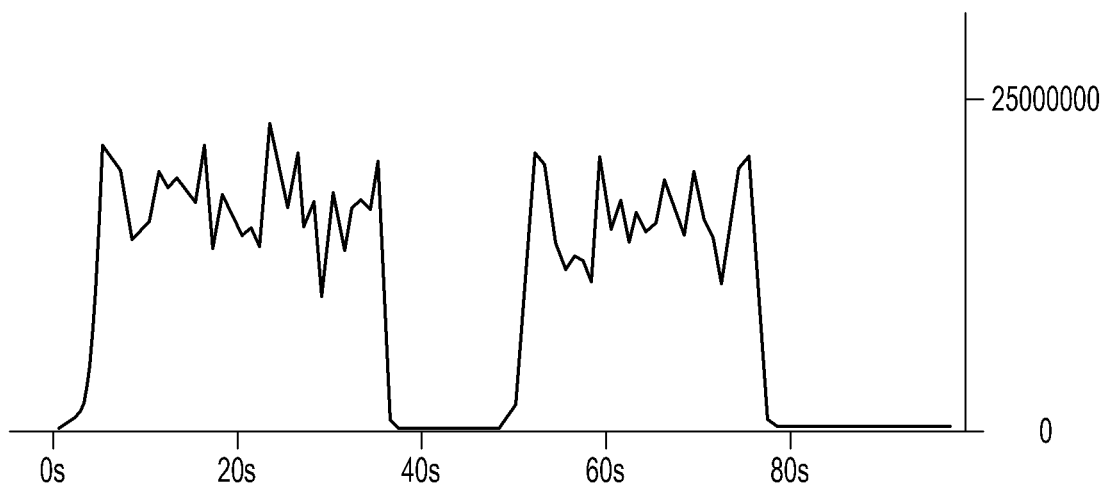

FIGS. 3A and 3B are graphs illustrating examples of an upload transfer rate over time in a case where a chunk size is changed in the experimental environment of FIG. 2 according to various embodiments of the present disclosure.

Referring to FIG. 3A, the default chunk size is set to, for example, 1 MB in the experiment, and in this case, the average rate is 2.4 Mbps.

Referring to FIG. 3B, the maximum chunk size is set to, for example, 60 MB in the experiment, and in this case, the average rate is 9.98 Mbps.

Referring to FIGS. 3A and 3B, it can be seen that as the chunk size increases, the idle time occurring between chunk transmissions is reduced. Accordingly, it can be seen that as the chunk size increases from 1 MB to 60 MB, the upload speed (or upload rate) increases 4.16 times from 2.4 Mbps to 9.98 Mbps.

Therefore, an embodiment of the present disclosure provides a method for adaptively controlling the chunk size in a device that will upload the data to the cloud storage.

For example, in an embodiment of the present disclosure, the past and current contexts for the device's user may be collected, and based thereon, the probability for the network disconnection and the upload transfer rate may be predicted. The past context according to an embodiment of the present disclosure is a parameter related to the history that the device has uploaded for each of the cloud storage, and may include information about the time and place at which the device performed the upload, the type (e.g., an identifier of the base station/access point (AP)) of the network to which the device was connected during the upload, and the type of the cloud storage to which the device uploaded the data. The time may include the total chunk transfer time, the total chunk transfer attempt count, and the upload failure count among the total chunk transfer attempt count. The current context according to an embodiment of the present disclosure may include information about the device's mobility, the strength of the signal received by the device, and the cloud storage currently in use. The past context according to an embodiment of the present disclosure will be described in more detail below.

An embodiment of the present disclosure provides a method in which the device may determine the initial chunk size considering the predicted probability for the network disconnection, or the moving speed, and adaptively change the chunk size during every chunk transmission, thereby maximizing the upload speed. Further, an embodiment of the present disclosure provides a method in which the server providing the cloud storage may differently assign the adjustable parameters by distinguishing the user's class, for upload of the device. The parameters adjustable by the server may include the number of sessions uploaded from a mobile terminal to the cloud storage, and a response latency for chunk reception within the session.

Generally, in order to minimize the retransmission situation for upload of the cloud storage, parameters (e.g., a signal-to-noise ratio, a packet error rate or the like) related to packet errors may be considered. In comparison with this, in an embodiment of the present disclosure, the chunk transfer rate may be determined considering the past and current contexts managed by the device, thereby preventing the leakage of personal information, or the situation occurring during the server change.

Figure 4A:
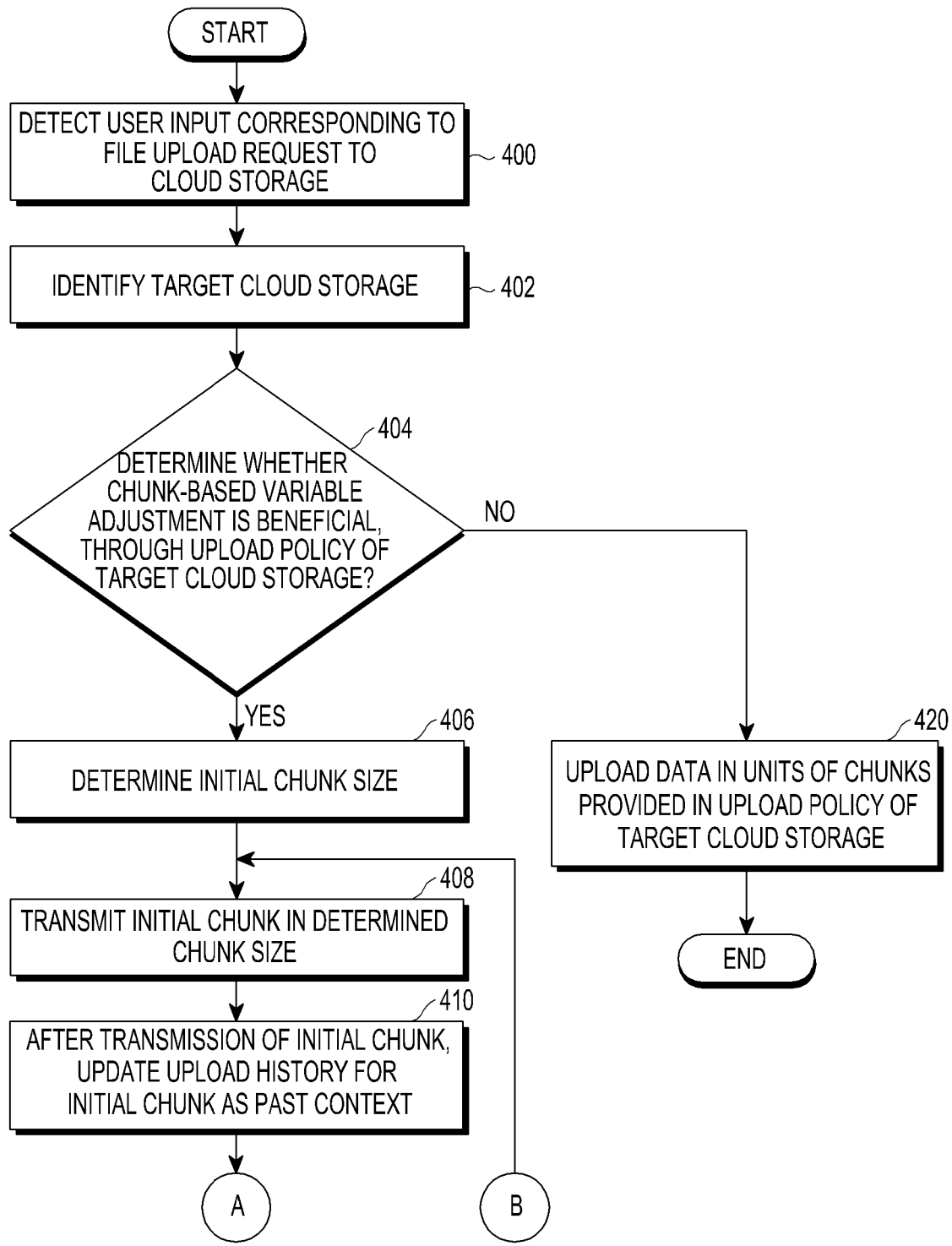
FIGS. 4A and 4B are flowcharts illustrating examples of an operation of a mobile terminal according to various embodiments of the present disclosure.
Figure 4B:
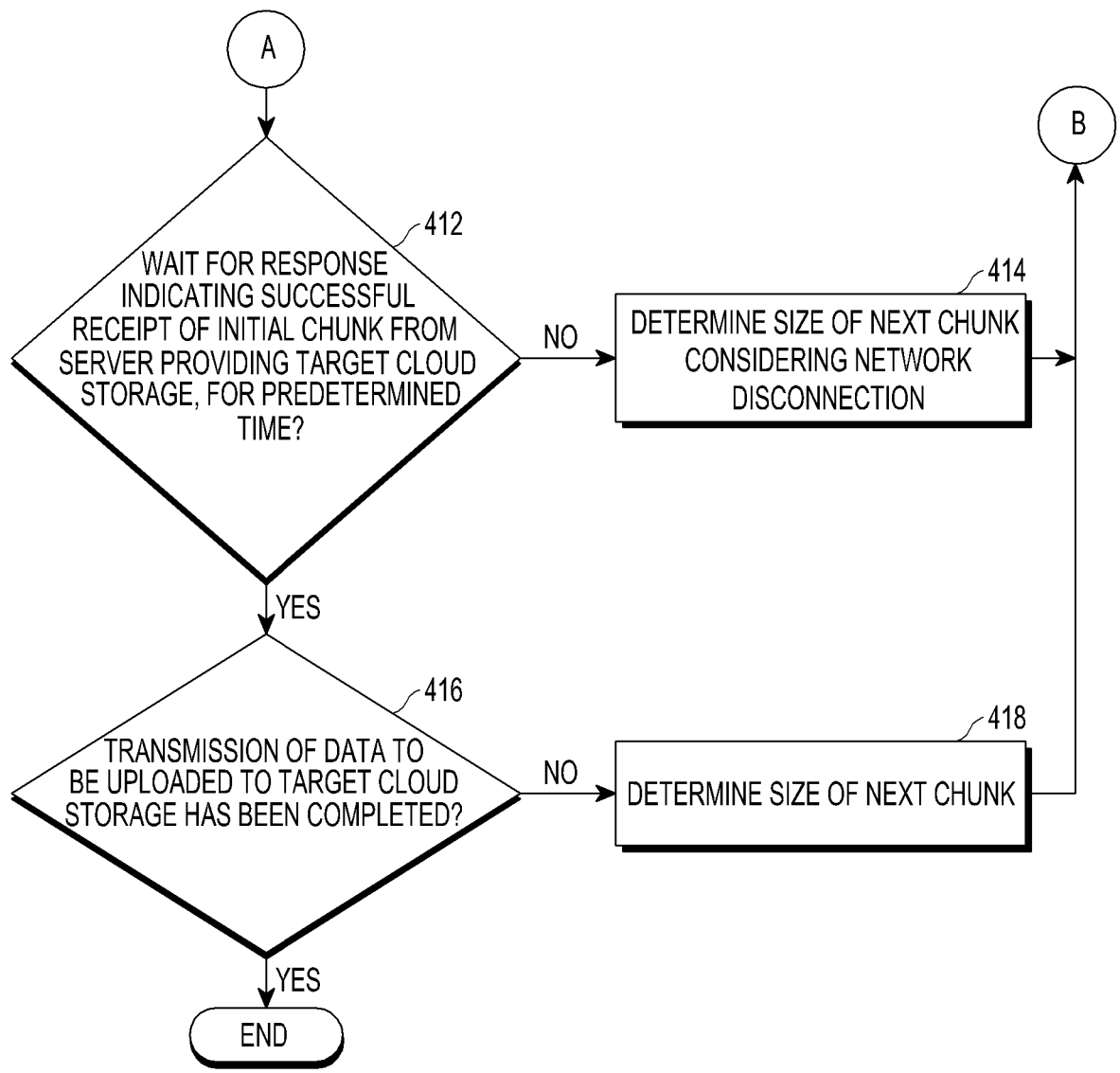

For example, in an embodiment of the present disclosure, the device's user may operate as shown in FIGS. 4A and 4B in order to adaptively determine the size of the chunk to be uploaded to the cloud storage based on the past and current contexts related to the storage, which are uploaded to the cloud storage.

FIGS. 4A and 4B are flowcharts illustrating examples of an operation of a mobile terminal according to various embodiments of the present disclosure.

Referring to FIGS. 4A and 4B, in operation 400, the device (or mobile terminal) may detect a user input corresponding to a file upload request to the cloud storage. In operation 402, the mobile terminal may identify the target cloud storage to which the mobile terminal will currently upload the data. In operation 404, the device may determine whether there is a need to variably adjust the unit of the chunk to be uploaded, by checking the upload policy provided in the cloud storage. Herein, in determining whether there is a need to variably adjust the unit of the chunk to be uploaded, the device may determine that there is a need to variably adjust the unit of the chunk, in a case where, for example, the upload policy provided in the identified cloud storage supports the retransmission scheme in which, when an error occurs during the upload, retransmission of the data is not possible at the point where an error has occurred, and the data should be retransmitted beginning at the starting point of the chunk in which the error has occurred. In this case, if the upload policy supports the retransmission scheme in which the data retransmission is possible at the point where an error has occurred during the upload, the device may determine that there is no need to variably adjust the unit of the chunk. As another example, it is assumed that there is no significant difference between the maximum chunk size provided in the upload policy of the cloud storage and the size of the data to be currently transmitted. In this case, due to the limitation of the maximum chunk size, the size of the data to be currently transmitted may be set smaller than the maximum chunk size. Since the size of the data is not large, there is no need to transmit the data in the size larger than the maximum chunk size. In this case, the device may determine that there is no need to variably adjust the unit of the chunk. As a result of the determination, if there is no need to variably adjust the unit of the upload chunk, the device may upload the data in units of chunks provided in the upload policy of the target cloud storage in operation 420.

On the other hand, as a result of the determination, if there is a need to variably adjust the unit of the upload chunk, the device may determine an initial chunk size in operation 406. The case where there is a need to variably adjust the unit of the upload chunk may correspond to, for example, a case where as described above, the size of the data to be transmitted is quite large, compared with the maximum chunk size provided in the upload policy of the target cloud storage. An operation of determining the initial chunk size according to an embodiment of the present disclosure will be described below with reference to FIG. 5.

Thereafter, in operation 408, the device may upload the initial chunk in the initial chunk size determined in operation 406. In operation 410, after the transmission of the initial chunk, the device may update the upload history for the initial chunk as the past context. In an embodiment of the present disclosure, the mobile terminal includes a database (DB) for managing and storing the past and current contexts to be used in the determination of the chunk size, and updates herein the upload history for the initial chunk. In this case, the updated information may include, for example, the size of the initial chunk, the transfer count for the corresponding size, the place and time at which the initial chunk is transmitted, and the type of the data, and the updated information may be mapped and stored in the target cloud storage.

In operation 412, the device may wait for a predetermined time for a response indicating the successful reception of the initial chunk from the server providing the target cloud storage. The predetermined time may be obtained from the upload policy provided in the target cloud storage. If no response has been received for the predetermined time, the device may determine a transmission failure of the initial chunk, and identify the cause of the transmission failure of the initial chunk in operation 414. Further, the device may determine the size of the next chunk depending on the cause of the transmission failure of the initial chunk, and return to operation 406. An operation of identifying, by the mobile terminal, the cause of the transmission failure of the initial chunk and determining the size of the next chunk depending on the identified cause will be described in detail below with reference to FIG. 6.

If a response has been received from the server for a predetermined time, the device may determine in operation 416 whether the transmission of the data to be uploaded to the target cloud storage has been completed. As a result of the determination, if the transmission of the data to be uploaded to the target cloud storage has been completed, the device may end the upload operation.

On the other hand, as a result of the determination, if the transmission of the data to be uploaded to the target cloud storage has not been completed, the device may determine the size of the next chunk in operation 418, and return to operation 406. An operation of successfully uploading a previous chunk, and then, determining the size of the next chunk according to an embodiment of the present disclosure will be described below with reference to FIGS. 7A and 7B.

Figure 6:
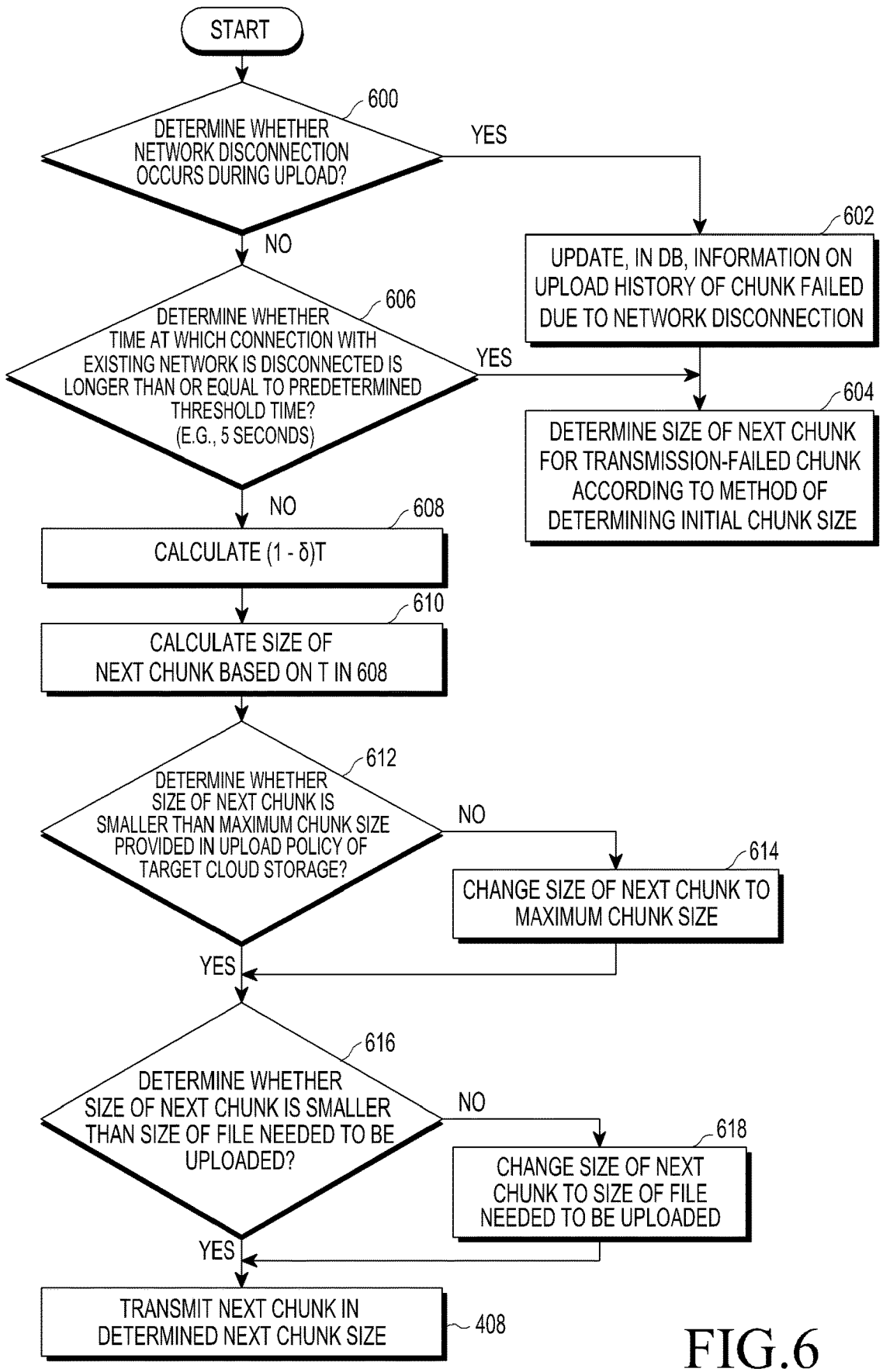
FIG. 6 is a flowchart illustrating an example of an operation of determining a size of a next chunk considering a network disconnection by a mobile terminal according to an embodiment of the present disclosure.
Figure 7A:
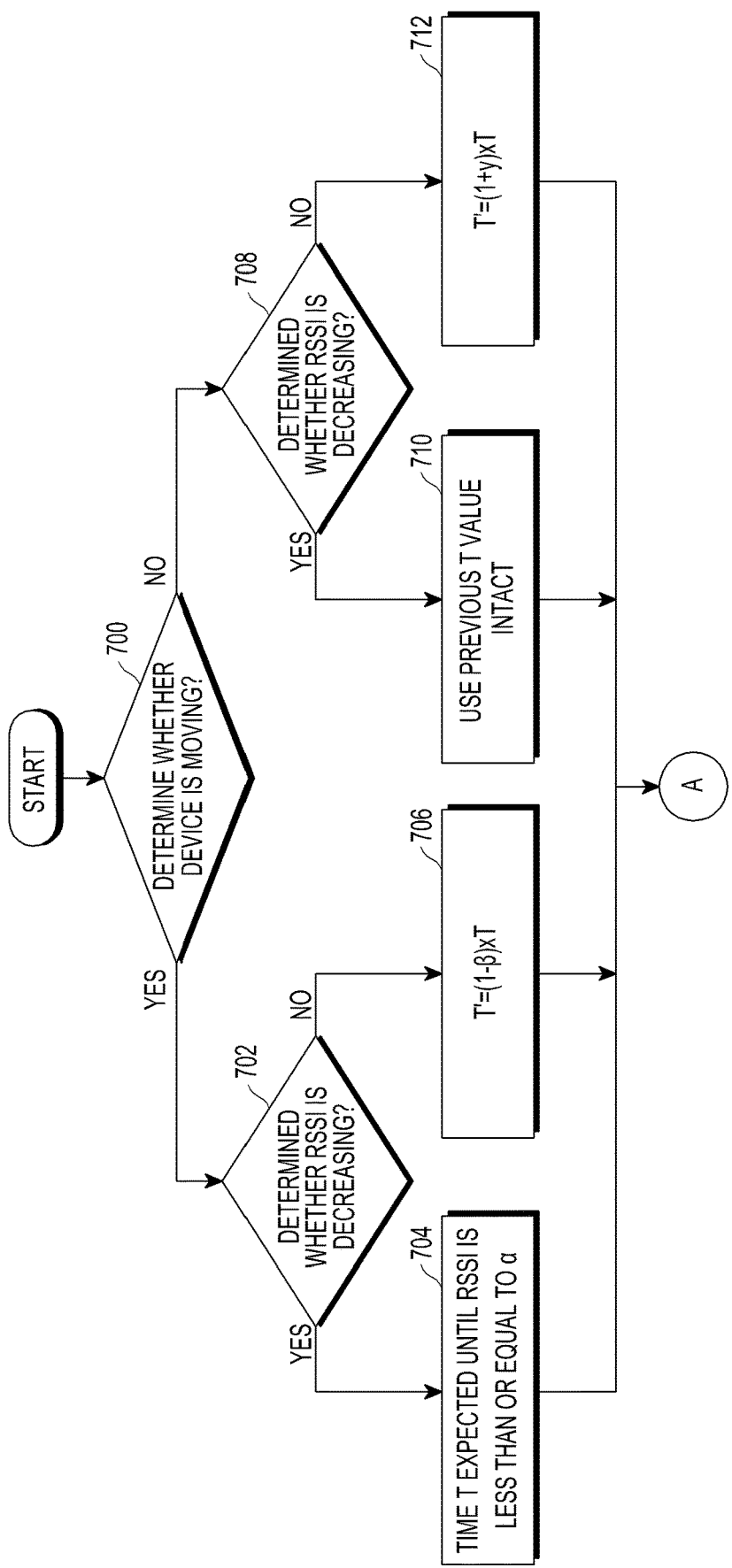
FIGS. 7A and 7B are flowcharts illustrating examples of an operation of determining a size of a next chunk after a successful transmission of a previous chunk according to various embodiments of the present disclosure.
Figure 7B:
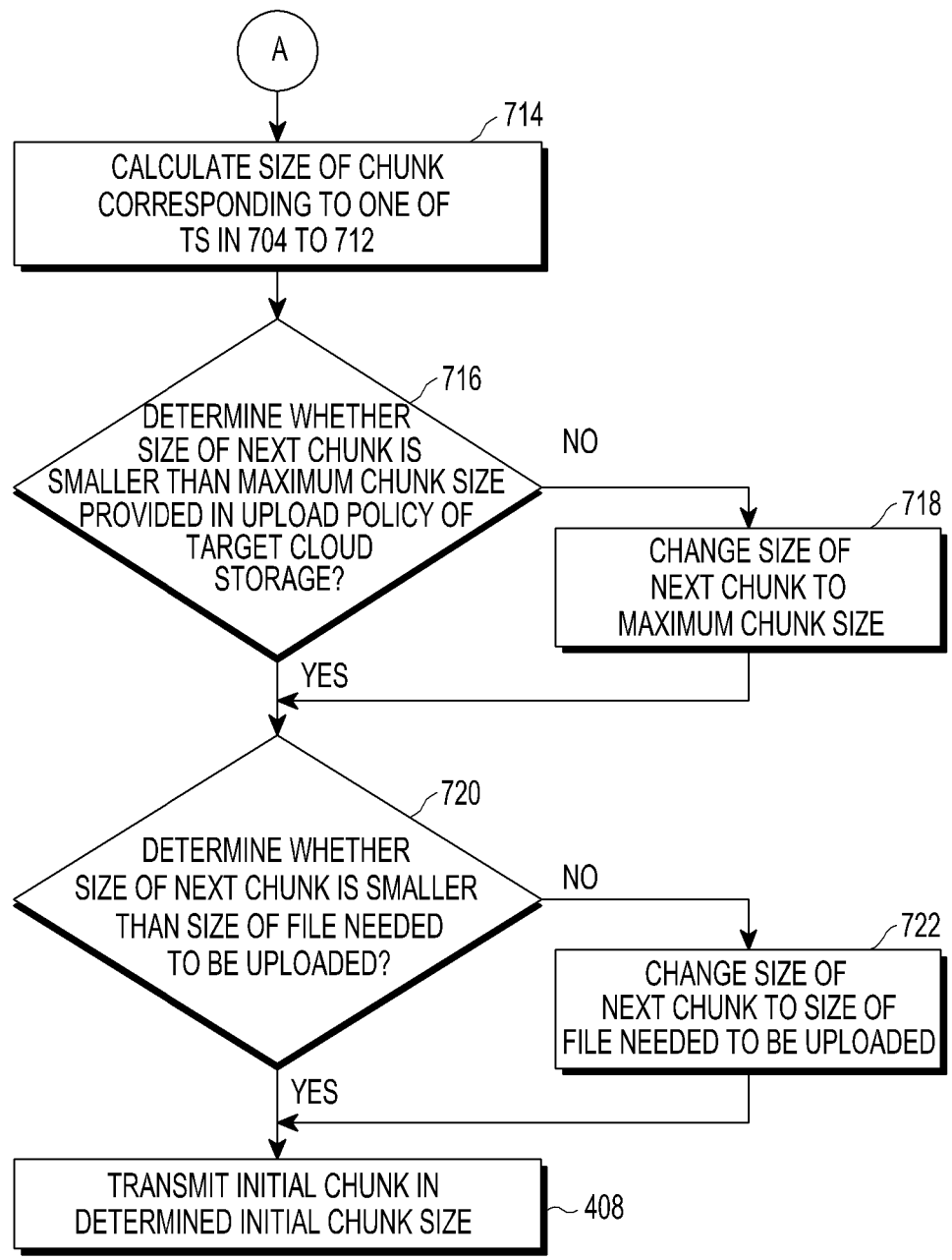

Referring to FIGS. 4A and 4B, the device may repeat an operation of determining the size of the next chunk and uploading the chunk based thereon according to various embodiments in FIGS. 6, 7A, and 7B, until the transmission of the data to be uploaded to the target cloud storage is completed.

Figure 5:
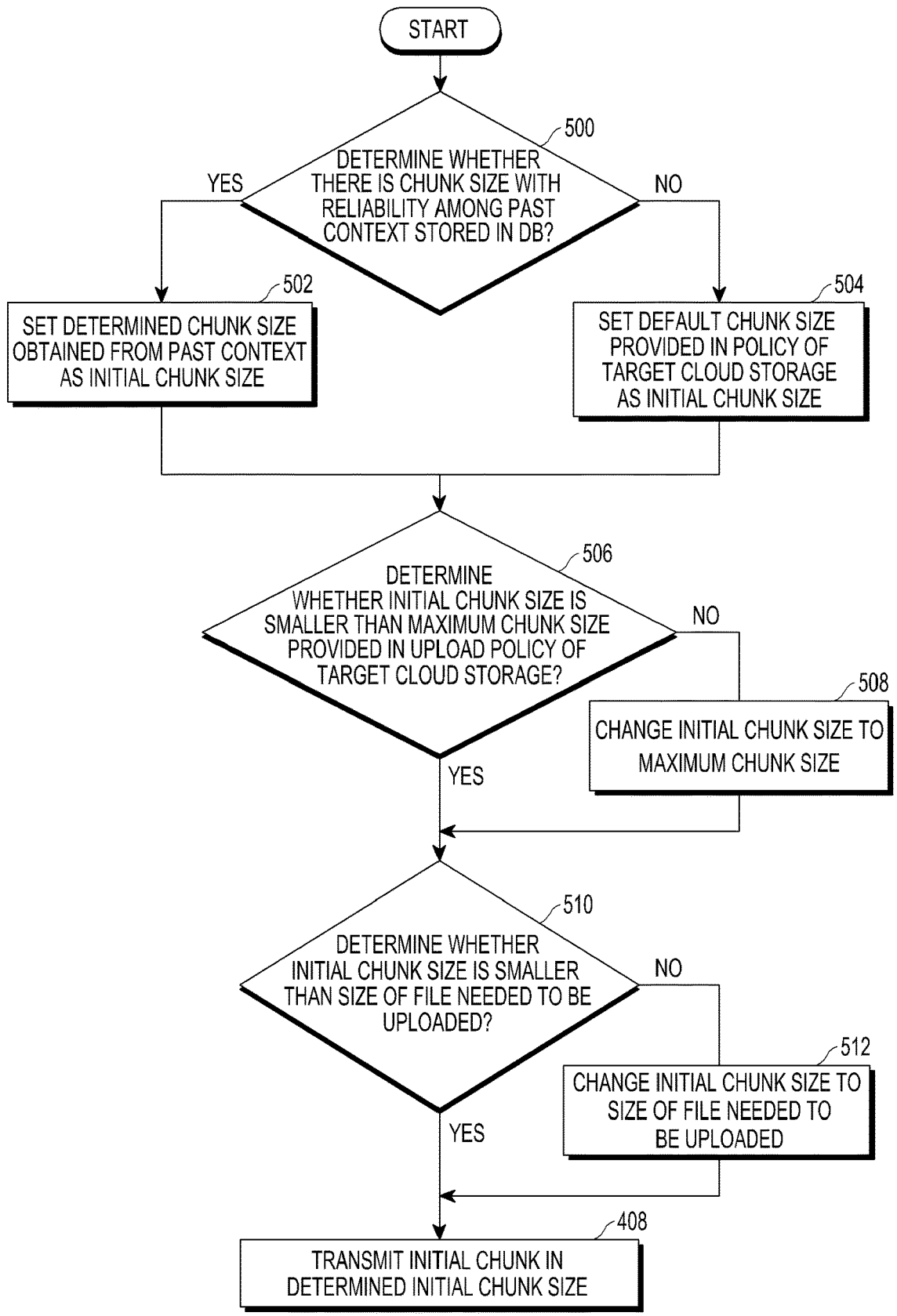
FIG. 5 is a flowchart illustrating an example of an operation of determining a size of an initial chunk according to an embodiment of the present disclosure.

FIG. 5 is a flowchart illustrating an example of an operation of determining a size of an initial chunk according to an embodiment of the present disclosure.

Referring to FIG. 5, the mobile terminal may determine in operation 500 whether a chunk size with the reliability exists in the past context stored in the DB. For example, if a chunk size with the upload history mapped to the target cloud storage exists in the past context, the mobile terminal may determine the reliability for the chunk size. Whether the reliability for the chunk size exists may be determined, if the chunk size satisfies, for example, a condition such as whether the transfer count with the chunk size is greater than or equal to a predetermined count, and/or whether the standard deviation of the upload speed during the transfer with the chunk size is less than or equal to a predetermined value. As a result of the determination, if the reliability of the chunk size is accepted, the mobile terminal may determine the chunk size obtained from the past context as an initial chunk size in operation 502.

On the other hand, as a result of the determination, if the reliability is not accepted as the chunk size obtained from the past context does not satisfy the above conditions, the mobile terminal may determine the default chunk size provided in the upload policy of the target cloud storage as an initial chunk size in operation 504. The chunk size according to an embodiment of the present disclosure may be calculated by Equation 1 below.

$$\text{Chunk Size (Mb)} = \text{Transfer Rate (Mbps)} * T(\text{seconds}) \quad \text{Equation 1}$$

where 'T' represents the maximum transfer time in which the chunk is expected to be stably transmitted without the occurrence of the network disconnection, and is a value that can vary depending on the user's past and current contexts, and 'Transfer Rate' represents the average upload transfer rate obtained from the past context.

As the chunk size is determined by the product of T and Transfer Rate defined as in Equation 1, the chunk size according to an embodiment of the present disclosure may be defined as the maximum amount of transmittable data, by which the chunk is expected to be stably transmitted without the occurrence of the network disconnection.

T for calculating the chunk size according to an embodiment of the present disclosure may be calculated by either of two methods. The first method may obtain T using the past context as in Table 2 below.

Table 2 below shows an example of the information stored in the DB that manages the past context according to an embodiment of the present disclosure.

Referring to Table 2, the DB may map and store the history information that the device has generated during the upload for each of the cloud storage having an upload history. The history information may include, for example, a network identifier, a start time at which the upload has occurred, the total chunk transfer time, the total chunk transfer attempt count and the average upload transfer rate.

If the past context as shown in Table 2 is stored in the DB, the device may obtain the average upload transfer rate by dividing the total chunk transfer time for the data by the total chunk transfer attempt count.

Assuming that the network disconnection occurs independently and the network disconnection occurrence count follows the Poisson process, the network disconnection occurrence gap may follow the exponential distribution. In this case, in the first method according to an embodiment of the present disclosure, T (seconds) in Equation 1 may be defined as the maximum transfer time that prevents the network disconnection from occurring at the probability of $P_{th}$. For example, assuming that $P_{th}$ is set to 0.9, it means that the probability that the network disconnection will now occur is 90%. Here, $P_{th}$ is a value defined in advance by the policy provided in the cloud storage, and this value can be changed. If the average chunk transfer time obtained based on the past context obtained from the DB is defined as μ, the T (seconds) may be calculated by Equation 2 below.

$$T = \mu^t n P_{th} \quad \text{Equation 2}$$

where μ can be represented as shown in Equation 3 below.

$$\mu = \frac{\text{Total Chunk Transfer Time}}{\text{Total Chunk Transfer Attempt Count}} \quad \text{Equation 3}$$

The second method may calculate T using Tables 3 and 4 below. Tables 3 and 4 below, respectively, show examples of the past context obtained from the DB and the network disconnection occurrence probability.

TABLE 2

| Cloud | Network ID | Time Zone | Total Chunk Transfer Time (seconds) | Total Chunk Transfer Attempt Count | Rate (Mbps) |
|---|---|---|---|---|---|
| Dropbox | XX:ea:XX:56:XX:e8 (Wi-Fi) | 2015.07.10 09:00 | 3600 | 3 | 50 |
| | 56:14405377:15 (LTE) | 2015.07.15 09:00 | 560 | 7 | 10 |
| | XX:ea:XX:78:XX:a7 (Wi-Fi) | 2015.07.15 09:00 | 480 | 8 | 8 |
| OneDrive | XX:ea:XX:37:XX:e8 (Wi-Fi) | 2015.07.13 10:00 | 9000 | 50 | 45 |
| | XX:ea:XX:78:XX:ea (Wi-Fi) | 2015.07.13 15:00 | 67530 | 12 | 30 |
| Google Drive | XX:ea:XX:78:XX:a7 (Wi-Fi) | 2015.07.09 12:00 | 62480 | 120 | 25 |

TABLE 3

| Cloud | Network ID | Time Zone | Total Chunk Attempt Count | Failure Count Among Chunk Transfer Attempts | Rate (Mbps) |
|---|---|---|---|---|---|
| Dropbox | XX:ea:XX:56:XX:e8 (Wi-Fi) | 2015.07.10 09:00 | 10 | 3 | 50 |
|  | 56:14405377:15 (LTE) | 2015.07.15 09:00 | 15 | 7 | 10 |
|  | XX:ea:XX:78:XX:a7 (Wi-Fi) | 2015.07.15 09:00 | 8 | 8 | 8 |
| OneDrive | XX:ea:XX:37:XX:e8 (Wi-Fi) | 2015.07.13 10:00 | 70 | 50 | 45 |
|  | XX:ea:XX:78:XX:ea (Wi-Fi) | 2015.07.13 15:00 | 35 | 12 | 30 |
| Google Drive | XX:ea:XX:78:XX:a7 (Wi-Fi) | 2015.07.09 12:00 | 240 | 120 | 25 |

TABLE 4

| Connection Failure Probability | Duration (sec.) |
|---|---|
| $0 < P \le 0.1$ | 20 |
| $0.1 < P \le 0.2$ | 18 |
| $0.2 < P \le 0.3$ | 16 |
| $0.3 < P \le 0.4$ | 14 |
| $0.4 < P \le 0.5$ | 12 |
| $0.5 < P \le 0.6$ | 10 |
| $0.6 < P \le 0.7$ | 8 |
| $0.7 < P \le 0.8$ | 6 |
| $0.8 < P \le 0.9$ | 4 |
| $0.9 < P \le 1$ | 2 |

In the case of the second method, the network disconnection occurrence probability and the upload transfer rate may be obtained from the past context in Table 3. The network disconnection occurrence probability may be calculated by dividing the failure count among the total chunk transfer attempts by the total chunk transfer attempt count. Based on the network disconnection occurrence probability calculated based on the past context in Table 3, a matched T value among the T values mapped for each network disconnection occurrence probability, which are posted in Table 4, may be used as the T (seconds) in Table 1.

Thereafter, in operation 506, the device may determine whether the initial chunk's size determined through operation 502 or 504 is smaller than the maximum chunk size provided in the upload policy of the target cloud storage. The maximum chunk size corresponds to the minimum unit of the chunk transmittable on the target cloud storage. Thus, as a result of the determination, if the initial chunk's size is not smaller than the maximum chunk size, the mobile terminal may change the initial chunk's size to the maximum chunk size in operation 508 since the device cannot transmit the chunk larger than the maximum chunk size to the cloud storage through the upload policy, and then proceed to operation 510.

On the other hand, as a result of the determination, if the initial chunk's size is smaller than the maximum chunk size, the mobile terminal may determine in operation 510 whether the initial chunk's size is smaller than the size of the file to be uploaded. The size of the file to be uploaded is a value obtained by excluding the uploaded amount from the size of the upload target file. As a result of the determination, if the initial chunk size is smaller than the size of the file to be uploaded, the mobile terminal may return to operation 408 and upload the initial chunk file. On the other hand, if the initial chunk size is greater than or equal to the size of the file to be uploaded, the mobile terminal may change the initial chunk's size to the size of the file to be uploaded in operation 512, and then proceed to operation 408.

FIG. 6 is a flowchart illustrating an example of an operation of determining a size of a next chunk considering a network disconnection by a mobile terminal according to an embodiment of the present disclosure.

Figure 1B:
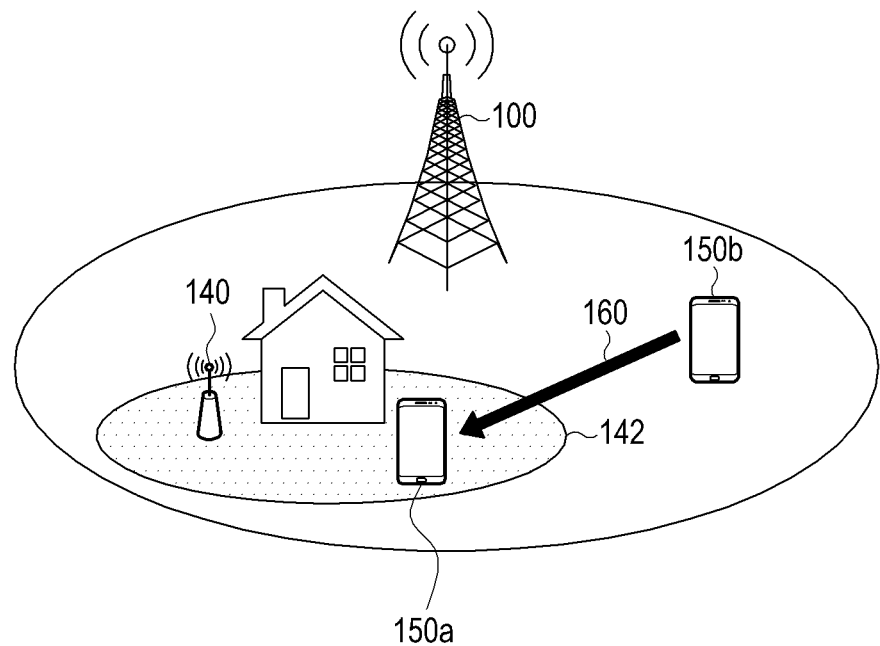

Referring to FIG. 6, the mobile terminal determines in operation 600 whether a network disconnection has occurred during upload of the chunk to the target cloud storage. As a result of the determination, if the network disconnection has occurred, the mobile terminal may update, in the DB, information about the upload history of the chunk, transmission of which is failed due to the network disconnection, in operation 602. The updated information may correspond to information (e.g., information posted in Table 3) about the transmission-failed chunk. On the other hand, as a result of the determination, if the network disconnection has not occurred, the mobile terminal may proceed to operation 606. The network disconnection may occur due to the handover or the like described in FIGS. 1A and 1B.

Even though the network disconnection has not occurred, there may be a situation in which the connection state with the existing network is poor due to the temporary situation (e.g., a significant change in the rate) of the communication channel. In order to determine this, the mobile terminal may determine in operation 606 whether the time for which the connection with the existing network has been disconnected is greater than or equal to a predetermined threshold time of, for example, 5 seconds. If the time is greater than or equal to the threshold time, the mobile terminal may proceed to operation 604, determining that the disconnection is a network disconnection due to the movement between networks. In operation 604, the mobile terminal may determine the size of the next chunk in accordance with the method for determining the size of the initial chunk according to an embodiment of the present disclosure. Here, the size of the chunk, transmission of which is failed due to the network disconnection, may be different from the size of the file to be uploaded. In this case, the size of the file to be uploaded is a value obtained by excluding the uploaded amount from the size of the upload target file. Accordingly, in an embodiment of the present disclosure, the size of the next chunk for the transmission-failed chunk may be determined as the chunk size obtained from the past context or the default chunk size provided in the policy of the target cloud storage according to the above-described initial chunk size determining operation in FIG. 5.

As a result of the determination, if the time for which the connection with the existing network has been disconnected is less than the threshold time, the mobile terminal may determine that the user's intervention or the network's temporary error has occurred. Accordingly, using a factor δ for reducing the chunk size, the mobile terminal may calculate a value T' obtained by multiplying the previous T value by (1−δ), as a new T value in operation 608. Here, δ may be set to a value that varies depending on the T value. In operation 610, the mobile terminal may obtain the size of the next chunk by multiplying the T value calculated in operation 608 by the transfer rate. In operation 612, the mobile terminal may determine whether the size of the next chunk is smaller than the maximum chunk size provided in the upload policy of the server providing the target cloud storage. As a result of the determination, if the size of the next chunk is not smaller than the maximum chunk size, the mobile terminal may change the size of the next chunk to the maximum chunk size in operation 614 since the device cannot transmit the chunk larger than the maximum chunk size to the cloud storage through the upload policy, and then proceed to operation 616.

As a result of the determination, if the size of the next chunk is smaller than the maximum chunk size, the mobile terminal may determine in operation 616 whether the size of the next chunk is smaller than the size of the file to be uploaded. As a result of the determination, if the size of the next chunk is smaller than the size of the file to be uploaded, the mobile terminal may return to operation 408 and upload the next chunk file. The size of the file to be uploaded is a value obtained by excluding the uploaded amount from the size of the upload target file. On the other hand, as a result of the determination, if the size of the next chunk is greater than or equal to the size of the file to be uploaded, the mobile terminal may change the size of the next chunk to the size of the file to be uploaded in operation 618, and then proceed to operation 408.

The size of the chunk according to an embodiment of the present disclosure may be determined as a value obtained by multiplying the transfer rate by the T value as described in Equation 1. Since the effect according to a received signal strength indicator (RSSI) value of the mobile terminal is reflected in the transfer rate, the RSSI value may affect even the size of the chunk. In other words, as the RSSI is higher, the transfer rate is likely to be higher, and as the RSSI is lower, the current transfer rate is likely to be lower. Therefore, after the previous chunk is successfully uploaded as in operation 418 of FIGS. 4A and 4B according to an embodiment of the present disclosure, if there is the next chunk to be transmitted, the T value may be calculated in fourth different cases depending on whether the RSSI value is reduced or whether the mobile has moved.

FIGS. 7A and 7B are flowcharts illustrating examples of an operation of determining a size of a next chunk after a successful transmission of a previous chunk according to various embodiments of the present disclosure.

Referring to FIGS. 7A and 7B, the mobile terminal may determine in operation 700 whether the mobile terminal itself is moving, using a motion recognition sensor. As a result of the determination, the mobile terminal may proceed to operation 702, if the mobile terminal is moving, and the mobile terminal may proceed to operation 708, if the mobile terminal is not moving.

Upon determining that the mobile terminal is moving, the mobile terminal may determine in operation 702 whether the RSSI is decreasing. As a result of the determination, if the RSSI is decreasing, the mobile terminal may calculate the time the RSSI value is to be less than or equal to α, in operation 704, and use the value as T. Whether the RSSI is decreasing may be determined by, for example, comparing RSSI values received in units of predetermined time to determine whether an RSSI value lower than the previous RSSI value is continuously received a predetermined number of times. In this case, α is an RSSI value at which the network disconnection is highly likely to occur, and may vary depending on the type (e.g., Wi-Fi, 3G, 4G or the like) of the network to which the mobile terminal is currently connected. On the other hand, as a result of the determination, if the RSSI is not decreasing, the mobile terminal may use a T' value obtained by multiplying the previous T value by (1−β), as a new T value in operation 706. Here, β is a factor for decreasing the size of the chunk, and may be a value for reflecting the fact that the network disconnection is highly likely to occur, since the mobile terminal is moving. The β according to an embodiment of the present disclosure may vary depending on the network disconnection occurrence probability obtained from the past context, or on the T value.

Upon determining that the mobile terminal is not moving, the mobile terminal may determine in operation 708 whether the RSSI is decreasing. As a result of the determination, if the RSSI is decreasing, the mobile terminal may use the previous T value intact in operation 710. If it is determined in operation 708 that the RSSI is not decreasing, the mobile terminal may use a T' value obtained by multiplying the previous T value by (1+γ), as a new T value in operation 712. Here, γ is a factor for increasing the size of the chunk, and may be a value for reflecting the fact that the network disconnection occurrence probability is low, since the RSSI is not decreasing. The γ may also vary depending on the network disconnection occurrence probability obtained from the past context, or on the T value.

Thereafter, in operation 714, the mobile terminal may calculate the size of the chunk based on the T in the case where the conditions in operations 704 to 712 are satisfied. After performing operations 716 to 722, the mobile terminal may return to operation 408. Since operations 716 to 722 operate in the same way as operations 612 to 618 in FIG. 6, the redundant description thereof will be omitted.

Another embodiment of the present disclosure provides a method for uploading the existing chunk-by-chunk structure in parallel using at least two or more sessions (i.e., multi-session) so that it is possible to use the resources of the server as much as possible and the differentiated services for the cloud storage may be provided for each user class. For the multi-session based parallel upload, the server's burden may increase in terms of managing the DB for multi-session. Therefore, another embodiment of the present disclosure may provide the multi-session based parallel upload only to the users who have borne additional expenses, or provide the multi-session based parallel upload depending on the availability status of the server.

Figure 8:
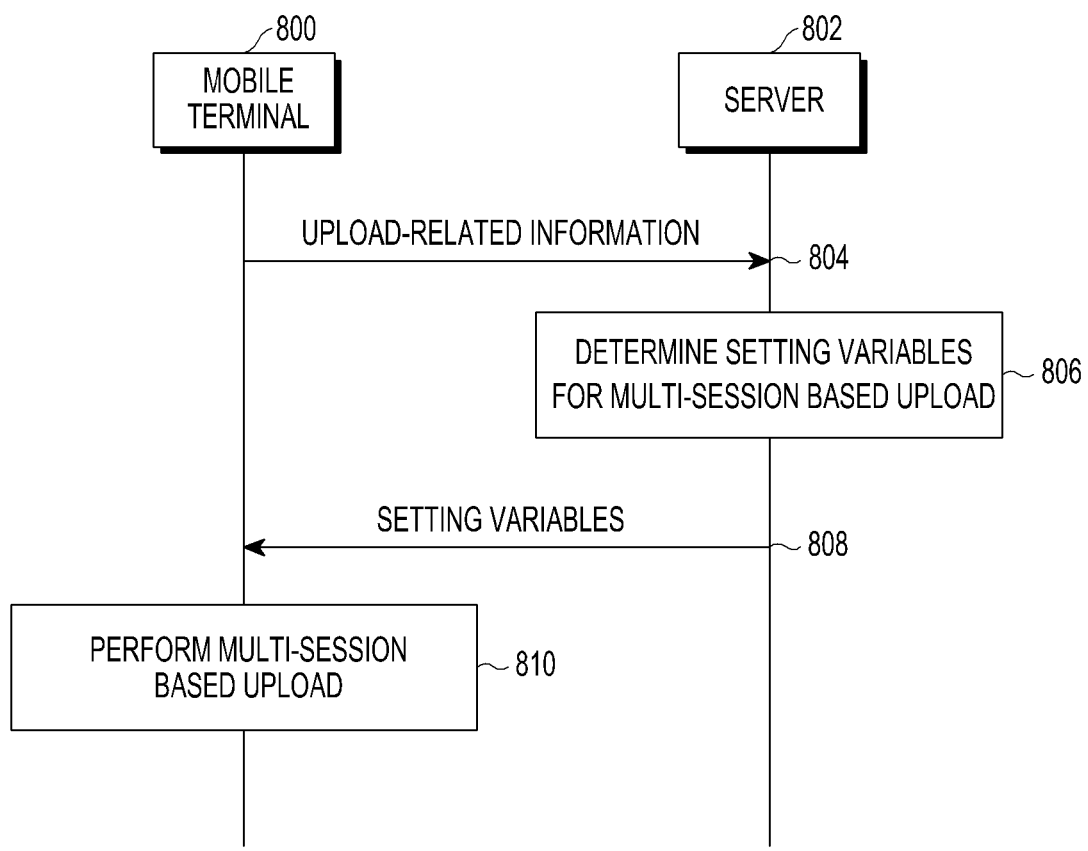
FIG. 8 is a flowchart illustrating an example of an operation for multi-session based upload according to another embodiment of the present disclosure.

FIG. 8 is a flowchart illustrating an example of an operation for multi-session based upload according to another embodiment of the present disclosure.

Referring to FIG. 8, if data to be uploaded is generated in a mobile terminal 800, the mobile terminal 800 may transmit upload-related information including the user's identifier, the terminal's status information and the file information to a server 802 providing the target cloud storage, to which the mobile terminal 800 will upload the data, in operation 804. The terminal's status information may include the maximum network rate between the mobile terminal 800 and the server 802, the remaining battery power of the mobile terminal, and information indicating that the battery is being charged. The file information may include the type and size of the data to be transmitted by the user.

Upon receiving the upload-related information, the server 802 may check the user class of the mobile terminal and the current status for the availability of the server 802 using the user's identifier, to determine the setting variables for the multi-session based upload of the mobile terminal 800, in operation 806. Otherwise, the server 802 may check whether it can support the minimum power capable of performing multi-session based on the remaining battery power or the charging status of the mobile terminal, and based thereon, the server 802 may determine the setting variables for the multi-session based upload of the mobile terminal 800. The setting variables may include information indicating whether the mobile terminal 800 can perform multi-session based upload, the number of sessions allowable during upload, and the response latency for chunk reception within the session. In operation 808, the server 802 may transfer information about the setting variables to the mobile terminal 800. In operation 810, the mobile terminal 800 may perform upload through at least one session based on the information about the setting variables for the upload. The mobile terminal 800 may determine the size of the chunk to be uploaded in each session for the upload based on the above-described operations in FIGS. 4A, 4B, 5, 6, 7A, and 7B.

Figure 9:
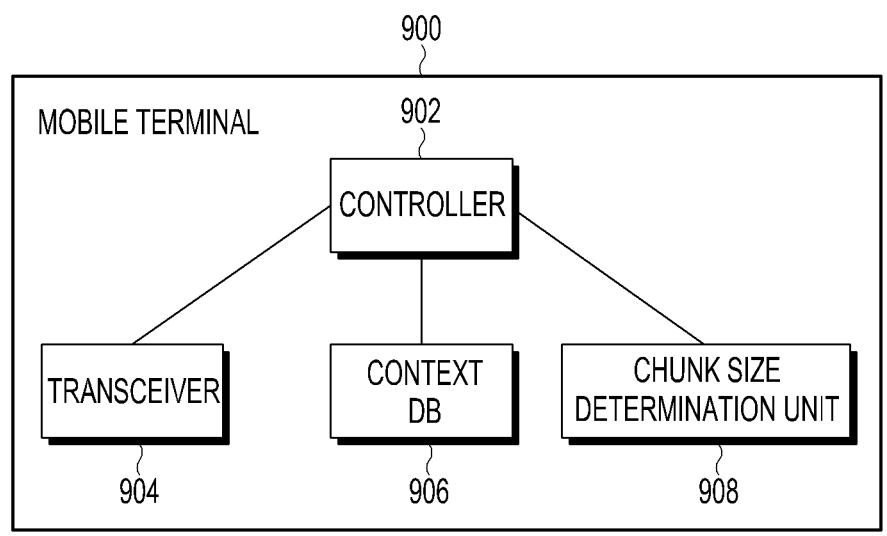
FIG. 9 is a block diagram of a mobile terminal according to an embodiment of the present disclosure.

FIG. 9 is a block diagram of a mobile terminal according to an embodiment of the present disclosure.

Referring to FIG. 9, the mobile terminal 900 may include, for example, a controller 902, a transceiver 904, a context DB 906, and a chunk size determination unit 908. The above configuration of the mobile terminal 900 is shown as an example, and the components of the mobile terminal 900 may be subdivided into sub units, or integrated into one unit according to the operator's intention or various embodiments.

The controller 902 may perform the overall operation for determining the chunk size for upload of the mobile terminal 900 according to an embodiment of the present disclosure.

The transceiver 904, under control of the controller 902, may receive a reception response of the transmission chunk received from the server providing the target cloud storage, and transmit the data to be uploaded to the cloud storage.

The context DB 906 may, as described above, store and update the past or current contexts used in the determination of the size of the initial chunk or the size of the next chunk for each of the target cloud storage according to an embodiment of the present disclosure.

Finally, the chunk size determination unit 908, under control of the controller 902, may determine the size of the chunk to be uploaded according to an embodiment of the present disclosure. As for the determination of the size of the initial chunk and the next chunk and the determination of the size of the chunk in consideration of the network disconnection, the determinations are made according to the operations in FIGS. 5, 6, 7A, and 7B, so the redundant description thereof will be omitted.

Further, the controller 902 may control the remaining components so that the multi-session based parallel upload according to an embodiment of FIG. 8 may be performed, according to an embodiment of the present disclosure, and the remaining components, under control of the controller 902, may also operate in correspondence to the operation in FIG. 8.

As described above, by adaptively adjusting the size of the chunk to be uploaded, based on the past and current contexts generated based on the upload history for the user of the mobile terminal according to an embodiment of the present disclosure, it is possible to improve the upload speed to the target cloud storage. Further, according to another embodiment of the present disclosure, the server may intelligently assign the setting variables of the multi-session based upload to the mobile terminal considering the user class, the server and terminal's resource availability status, and the upload file information, and transfer the setting variables to the mobile terminal, so it is possible to provide the cloud storage service by cost-effectively utilizing the resources of the server as much as possible.

Specific aspects of the present disclosure may also be implemented as a computer-readable code in a computer-readable recording medium. The computer-readable recording medium may be any data storage device that can store the data that can be read by the computer system. Examples of the computer-readable recording medium may include read only memories (ROMs), random access memories (RAMs), compact disk-read only memories (CD-ROMs), magnetic tapes, floppy disks, optical data storage devices, and carrier waves (such as data transmission over the Internet). The computer-readable recording medium may be distributed over the computer systems connected to the network, so the computer-readable code may be stored and executed in a distributed manner. Further, the functional programs, codes and code segments for achieving the present disclosure may be easily construed by the programmers skilled in the field to which the present disclosure is applied.

Further, it will be appreciated that the apparatus and method according to an embodiment of the present disclosure can be implemented in the form of hardware, software or a combination thereof. Any such software may be stored in a volatile or nonvolatile storage device (e.g., erasable/rewritable ROM), a memory (e.g., RAM, memory chip, memory device or integrated circuit (IC)), or an optically or magnetically recordable machine (e.g., computer)-readable storage medium (e.g., compact disk (CD), DVD, magnetic disc, or magnetic tape). The method according to an embodiment of the present disclosure may be implemented by the computer or the mobile terminal, which includes a computer or a memory, and it will be appreciated that the memory is an example of the machine-readable storage medium suitable to store a program or programs including instructions implementing embodiments of the present disclosure.

Therefore, the present disclosure may include a program including a code for implementing the apparatus and method as set forth in any claim of the specification, and a machine (or computer)-readable storage medium storing the program. Further, the program may be electrically transferred through any media such as the communication signals transmitted through wired/wireless connections, and the present disclosure may appropriately include equivalents thereto.

Further, the apparatus according to an embodiment of the present disclosure may receive the program from a program server (or a program providing device) that is connected to the apparatus by wires or wirelessly, and store the received program. The program server may include a memory for storing a program including instructions allowing the program server to perform the data upload method, and storing the information required for the data upload method, a communication unit for performing wired/wireless communication with the apparatus, and a controller for transmitting the program to a transceiver automatically or at the request of the apparatus.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for adjusting a chunk size of data to be uploaded to a server by a device, the method comprising:
identifying whether a size of data to be uploaded needs to be change based on an upload policy of the server;
in response to identifying that the size of data to be uploaded needs to be change, identifying a first chunk size for an upload of the data to the server based on an upload history associated with the server;
uploading, to the server, a first chunk of the data corresponding to the first chunk size, the first chunk of the data being a part of the data;
identifying whether a response associated with the first chunk is received from the server during a predetermined time;
based on the response being not received from the server during the predetermined time, identifying whether a time for which a connection with a network is disconnected is greater than or equal to a threshold time;
based on the time being less than the threshold time, identifying a second chunk size that is reduced by a predetermined unit from the first chunk size, based on an updated upload history associated with the server and a maximum chunk size provided in an upload policy of the server; and
uploading, to the server, a second chunk of the data corresponding to the second chunk size,
wherein the identifying of the second chunk size comprises:
when the response is received during the predetermined time, identifying whether uploading of the first chunk is completed; and
when the uploading of the first chunk is not completed, identifying the second chunk size based on a moving state of the device and a strength of a received signal.

2. The method of claim 1, further comprising:
in response to identifying of the network disconnection, updating the upload history associated with the server; and
based on the time being greater than or equal to the threshold time, identifying the second chunk size for remaining data except for uploaded chunk among the data as a default chunk size provided in the upload policy.

3. The method of claim 1, wherein the identifying of the first chunk size comprises:
obtaining a chunk size based on the upload history associated with the server, and a transmission number of the first chunk, wherein the upload history includes one or more chunk sizes for one or more uploads between the device and the server;
identifying the first chunk size as the obtained chunk size, when the transmission number of the first chunk is less than a transfer number threshold or a standard deviation of an upload speed is less than a predetermined threshold; and
identifying the first chunk size as a default chunk size provided in the upload policy of the server, when the transmission number of the first chunk is greater than the transfer number threshold and the standard deviation of the upload speed is greater than the predetermined threshold.

4. The method of claim 1, wherein the identifying of the first chunk size comprises:
comparing the first chunk size with a maximum chunk size for the server obtained from the upload history; and
identifying the first chunk size as the maximum chunk size, when the first chunk size is greater than the maximum chunk size.

5. The method of claim 1, wherein the upload history comprises at least one of an uploaded chunk size, an upload place, an upload occurrence time, a transfer time of the first chunk, a transfer count for the first chunk, an average upload speed, or a data type, for each server to which the device is connected.

6. A device for adjusting a chunk size to be uploaded to a server, the device comprising:
a transceiver coupled to at least one processor; and
the at least one processor configured to:
identify whether a size of data to be uploaded needs to be change based on an upload policy of the server;
in response to identifying that the size of data to be uploaded needs to be change, identify a first chunk size for an upload of data to the server based on an upload history associated with the server,
upload, to the server, a first chunk of the data corresponding to the first chunk size, the first chunk of the data being a part of the data,
identify whether a response associated with the first chunk is received from the server during a predetermined time,
based on the response being not received from the server during the predetermined time, identify whether a time for which a connection with a network is disconnected is greater than or equal to a threshold time,
based on the time being less than the threshold time, identify a second chunk size that is reduced by a predetermined unit from the first chunk size, based on an updated upload history associated with the server and a maximum chunk size provided in an upload policy of the server, and
upload, to the server, a second chunk of the data corresponding to the second chunk size,
wherein the at least one processor is further configured to:
when the response is received during the predetermined time, identify whether uploading of the first chunk of the data is completed, and
when the uploading of the first chunk of the data is not completed, identify the second chunk size based on a moving state of the device and a strength of a received signal.

7. The device of claim 6, wherein the at least one processor is further configured to:
in response to identifying of the network disconnection, update the upload history associated with the server, and
based on the time being greater than or equal to the threshold time, identify the second chunk size for remaining data except for uploaded chunk among the data as a default chunk size provided in the upload policy.

8. The device of claim 6, wherein the at least one processor is further configured to:
obtain a chunk size based on the upload history associated with the server, and a transmission number of the first chunk, wherein the upload history includes one or more chunk sizes for one or more uploads between the device and the server, identify the first chunk size as the obtained chunk size, when the transmission number of the first chunk is less than a transfer number threshold or a standard deviation of an upload speed is less than a predetermined threshold, and identify the first chunk size as a default chunk size provided in a upload policy of the server, when the transmission number of the first chunk is greater than the transfer number threshold and the standard deviation of the upload speed is greater than the predetermined threshold.

9. The device of claim 6, wherein the at least one processor is further configured to:

compare the first chunk size with a maximum chunk size for the server obtained from the upload history; and identify the first chunk size as the maximum chunk size, when the first chunk size is greater than the maximum chunk size.

10. The device of claim 6, wherein the upload history comprises at least one of a data-uploaded chunk size, an upload place, an upload occurrence time, a transfer time of the first chunk, a transfer count for the first chunk, an average upload speed, or a data type, for each server to which the device is connected.

11. The method of claim 1, wherein the identifying of the second chunk size comprises:

identifying the second chunk size based on moving state of the device and a strength of a received signal.

12. The method of claim 11, further comprising:

comparing the identified second chunk size with a minimum chunk size for the server obtained from the upload history, and when the identified second chunk size is greater than the minimum chunk size, identifying the identified second chunk size as the minimum chunk size.

13. The device of claim 6, wherein the at least one processor is further configured to identify the second chunk size based on moving state of the device and a strength of a received signal.

14. The device of claim 13, wherein the at least one processor is further configured to:

compare the identified second chunk size with a minimum chunk size for the server obtained from the upload history, and when the identified second chunk size is greater than the minimum chunk size, identify the identified second chunk size as the minimum chunk size.

* * * * *